J. A. JOHNSON AND J. P. THOMPSON.
THEFT PREVENTING DEVICE FOR VEHICLES.
APPLICATION FILED APR. 4, 1921.

1,438,709.

Patented Dec. 12, 1922.
2 SHEETS—SHEET 1

WITNESSES

INVENTOR
J.A. Johnson
J.P. Thompson

ATTORNEYS

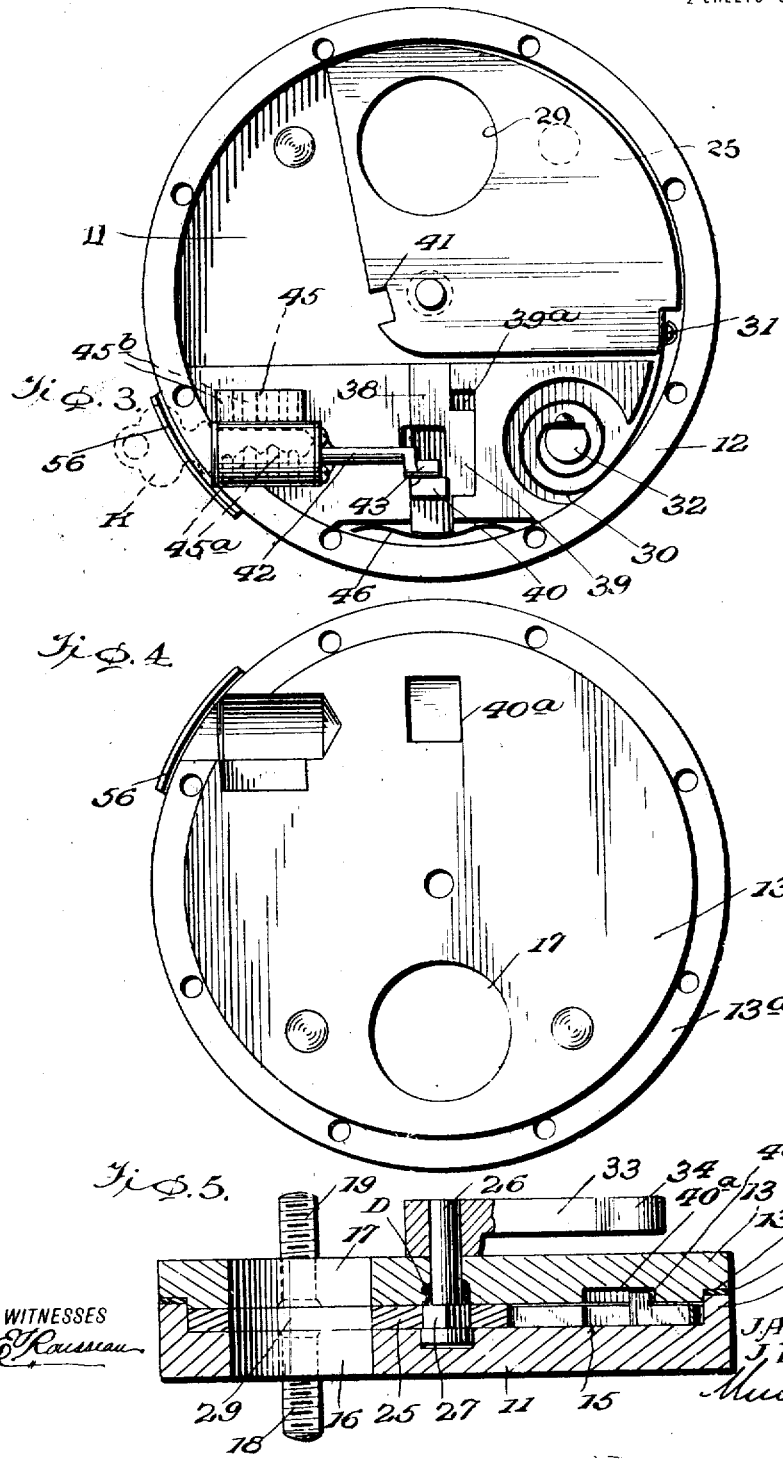

Patented Dec. 12, 1922.

1,438,709

UNITED STATES PATENT OFFICE.

JOHN ARTHUR JOHNSON AND JAMES PEARL THOMPSON, OF LEAVENWORTH, KANSAS.

THEFT-PREVENTING DEVICE FOR VEHICLES.

Application filed April 4, 1921. Serial No. 458,233.

*To all whom it may concern:*

Be it known that we, JOHN ARTHUR JOHNSON and JAMES PEARL THOMPSON, citizens of the United States, and residents of Leavenworth, in the county of Leavenworth and State of Kansas, have invented certain new and useful Improvements in Theft-Preventing Devices for Vehicles, of which the following is a specification.

The present invention relates to theft preventing devices for vehicles and is especially adapted for use with vehicles having a power plant of the internal combustion type.

The object of the invention is to provide a theft preventing device of this character which is associated with the fuel supply and which may be locked to shut off the fuel supply and preclude operation of the engine by an unauthorized person, which may be easily released by an authorized person to permit the free flow of fuel and operation of the vehicle, and which is of simple and durable construction, reliable in operation and easy and inexpensive to manufacture and apply.

Another object is to provide a theft preventing device of this character which is especially adapted for use with internal combustion engines of automobiles, trucks, tractors, boats, aeroplanes and the like, and which if desired may be utilized as a throttle for controlling the flow of the fuel to the engine.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 3 is a plan view with the top plate of the casing removed;

Figure 4 is a detail view in bottom plan of the top plate; and

Figure 5 is a transverse sectional view.

Figure 1:
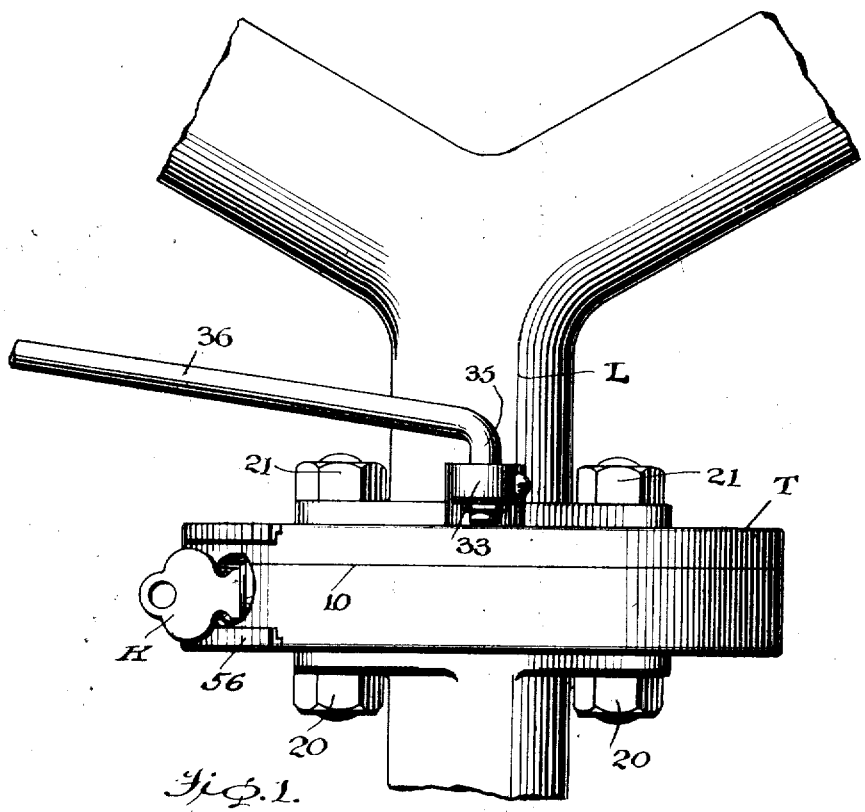
Figure 1 is an elevational view, illustrating the invention applied to the intake manifold of an internal combustion engine.
Figure 2:
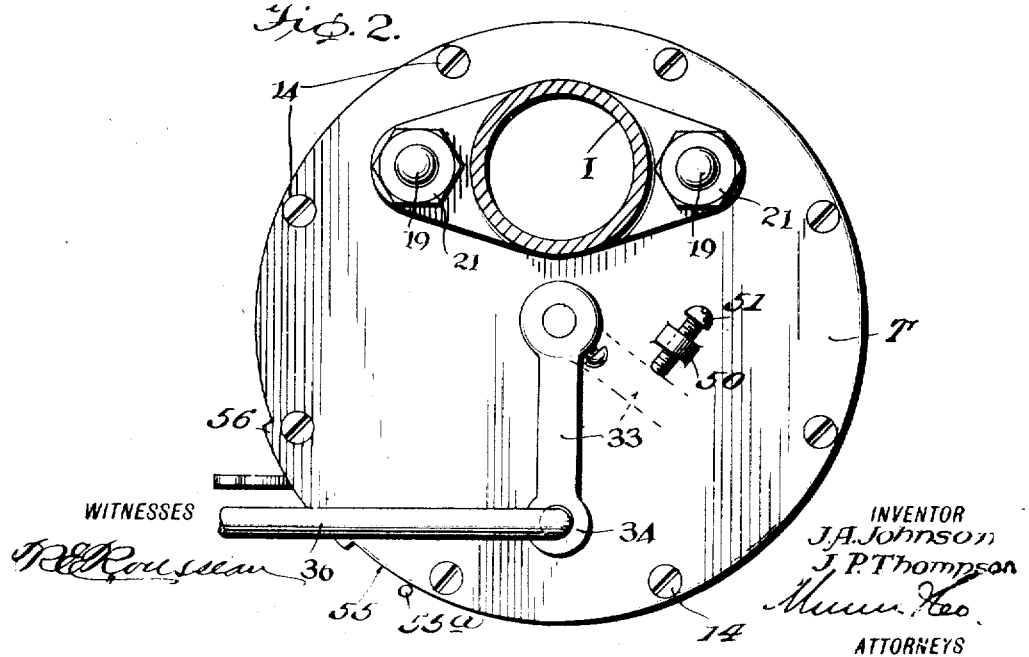
Figure 2 is a plan view, the manifold being shown in section.

Referring to the drawings wherein for the sake of illustration is shown the preferred embodiment of the invention it will be seen that the theft preventing device which is designated generally at T is organized with the fuel supply of an internal combustion engine, such for instance as an intake manifold L. The theft preventing device comprises a two-part casing designated generally at 10 and including a bottom plate 11 having a flange 12 and a top plate 13 having a reduced portion 13ª accommodating the flange. Screws 14 secure the plates together. The plates define a chamber 15 and they are provided with alined openings designated at 16 and 17, which also aline with the sections of the manifold. The casing is secured to the manifold by means of threaded studs 18 and 19 carried by the plates 11 and 12 of the casing and received in suitable openings provided therefor in the flanges of the sections of the manifold. Nuts 20 and 21 are threaded on the studs and secure the casing in position.

A swinging valve 25 is mounted in the chamber 15 of the casing, being carried by a rotatable valve shaft 26 journaled in the plates of the casing and connected to the valve by means of a squared portion 27 which engages in a similarly squared opening in the valve, as shown in Figure 5. The valve 25 is flat and has the general form of a sector and for its major portion it is imperforate. At one side, however, it is provided with a circular opening 29 which in the open position of the valve is adapted to be alined with the openings 16 and 17 and with the openings of the manifold to permit a free flow therethrough. When the imperforate portion of the valve is disposed between the openings 16 and 17 and lies across the manifold the flow is entirely cut off and the valve is closed.

Means is provided for normally maintaining the valve in open position and comprises a coil spring 30 secured, as at 31, to the valve 25 and secured at its other end to a stationary post 32. The spring is tensioned to maintain the valve in open position and resiliently opposes movement of the valve to closed position.

Operating mechanism is provided for adjusting the valve or for closing it against the tension of the spring 30. This operating mechanism includes a crank arm 33 fixed to the valve shaft 26 exteriorly of the casing and having an eye 34 formed at its outer end for receiving the offset end 35 of a control or operating rod 36 which extends to the dash or to any suitable point from which it is convenient to exercise control.

Packing means is provided for rendering the device gas-tight. This packing means may be of any conventional design or construction and preferably includes a gasket G and packing D.

Locking mechanism is associated with the valve for securing it in closed position and preventing its adjustment to open position by an unauthorized person. The locking mechanism is arranged in suitable bearings and cavities provided therefor in the plates 11 and 13 and comprises a sliding bolt 38 having an offset portion 39 and a guide lug 40 slidably engaged with a guide wall 39ª and a guide slot 40ª, respectively, for constraining the bolt to rectilinear motion. When the bolt is projected, it is received in a seat or keeper 41 provided in the valve 25. A rotatable shaft 42 has a crank arm 43 operatively engaged with the bolt 38, the bolt being suitably formed for this engagement. The shaft 42 is controlled by the key operated barrel of the lock cylinder 44. Spring operated push pins 45 including sections 45ª and 45ᵇ cooperate with the barrel in the usual manner and are operated upon by the key, designated at K, in the usual manner. It is obvious that when the key is rotated after having been inserted in the key slot of the barrel, the sections 45ª of the push pins prevent withdrawal of the key from the barrel until it is again moved back to initial position, that is to the position in which the sections 45ª of the push pins are alined with the sections 45ᵇ. A bowed blade spring 46 engages one end of the bolt and is tensioned to project the same when the bolt is released from engagement with the crank arm 43.

The valve 25 may be turned so that its imperforate portion lies across the passage defined by the openings 16, 29 and 17 without completely closing the valve and without alining the keeper or seat 41 with the bolt 38 and consequently without locking the valve when the locking mechanism is set as will be hereinafter more fully described. In order to limit the movement of the valve to cut off the passage without locking it a bumping post 50 is arranged upon the top plate 13 of the casing and carries an adjustable abutment such as a set screw 51 which may be adjusted to engage the crank arm 33. The bumping post is arranged upon the top plate so as to permit a complete closure of the valve when desired and in order to prevent this complete closure the set screw must be adjusted to extend a substantial distance from the bumping post.

A cover plate 55 is provided for the key hole of the locking mechanism. This cover plate may be of any desired construction but preferably comprises a sliding plate received in guide flanges 56 formed on the plates 11 and 13. The plate 55 is provided with a suitable grasping portion or knob 55ª.

In operation, when unlocking the device, the key K is inserted in the key slot of the barrel and the key is turned to rotate the barrel and the shaft 42 to engage the crank 43 thereof with the bolt 38 and retract it to the position shown in Figure 3. As soon as the bolt is retracted the coil spring 30 throws the valve 25 to open position with its opening 29 alined with the openings 16 and 17. If it is desired to use the valve 25 without locking, the key is left in the barrel and the valve 25 may be freely shifted from opened to closed position and to various intermediate positions as the locking mechanism is rendered inactive. When it is desired to set the locking mechanism so that the valve may be locked in closed position it is merely necessary to turn the key so as to rotate the barrel back to its initial position and to withdraw the key therefrom. When this is done, the shaft 42 has been rotated and its crank 43 has been moved out of engagement with the bolt 38. This permits the spring 46 to project the bolt into engagement with the adjacent portion of the valve 25. Thus when the valve is turned to closed position by suitable manipulation of the control rod 36 and crank 33 the bolt automatically snaps into the keeper 41 and secures or locks the valve 25 in closed position. When the valve 25 is so closed it completely cuts off the supply of fuel to the engine and precludes its operation, use or theft by an unauthorized person. It is to be noted that in the closed position of the valve the passage of the engine is completely obstructed so that flow of fuel or of the fuel mixture or air or hydrocarbon is prevented and operation of the engine is absolutely precluded. When the locking mechanism is set so that the valve may be locked in complete closed position, the device may nevertheless be used as a throttle if desired. This is brought about by adjusting the abutment 51 so that it lies in the path of the crank arm 33 and arrests the movement of this arm and consequently of the valve 25 before the valve has been completely turned to aline its keeper 41 with the bolt 38 but after the imperforate portion of the valve has been moved across the passage defined by the openings 16, 17 and 29. By turning the abutment 51 out of the path of the crank arm 33, the lock lug may be moved past the abutment to turn the valve 25 to complete closed position and aline its keeper 41 with the bolt 38 thereby permitting the spring 46 to snap the bolt into the keeper and lock the valve in closed position.

It is obvious that in the open position of the valve it affords no obstruction to the free flow of the fuel and conseqently in nowise impairs the efficiency of the engine.

We claim:

1. In a device of the character described for use with internal combustion engines having a fuel supply, a casing incorporated in the fuel supply consisting of upper and lower plates having openings communicating with the fuel supply, a swinging valve carried by the casing and having an imperforate portion and a portion provided with an opening, a coil spring arranged in the casing and connected at one end to the valve for maintaining it with its opening alined with the fuel supply to permit flow of fuel, operating means for swinging the imperforate portion of the valve across the fuel supply to prevent flow of fuel including a crank arm connected to the valve and an operating rod associated with the crank arm and locking mechanism for securing the valve in closed position including a bolt engageable with the valve, a spring for projecting the bolt into engagement, a rotatable shaft having a crank engageable with the bolt and a lock cylinder having a key-operated barrel controlling the rotatable shaft.

2. In a device of the character described, a casing, a swinging valve therein, a valve shaft carrying said valve, means for maintaining the valve in open position, operating means for closing the valve including a crank arm connected with the valve shaft, and an operating rod connected to the crank arm and locking mechanism for the valve including a bolt engageable therewith, a rotatable shaft controlling the bolt, and a lock cylinder having a key operated barrel controlling the rotatable shaft.

3. In a device of the character described, the combination with the manifold of an engine, a casing incorporated in said manifold and having openings affording a passage therethrough, a swinging valve arranged in said casing and controlling said passage, operating means for said valve, and locking mechanism for the valve including a bolt engageable therewith, a rotatable shaft controlling the bolt and a key-operated barrel controlling the rotatable shaft.

4. In a device of the character described, the combination with the manifold of an engine, a casing incorporated in said manifold and having openings affording a passage therethrough, a swinging valve arranged in said casing and controlling said passage, and locking mechanism for the valve including a bolt engageable therewith, a rotatable shaft controlling the bolt and a key operated barrel controlling the rotatable shaft.

5. In a device of the character described, the combination with the manifold of an engine, a two-part casing incorporated in said manifold and including upper and lower plates having alined openings therethrough communicating with the opening of the manifold and constituting a passage, means for securing the plates of the casing to the manifold, a swinging valve arranged in the casing and having an imperforate portion and a portion provided with an opening, spring means for maintaining the valve in open position, operating means for the valve, and locking mechanism for securing the valve in closed position including a bolt engageable with the barrel, a spring for projecting the bolt into engagement, a rotatable shaft having a crank engageable with the bolt and a lock cylinder having a cooperating barrel controlling the rotatable shaft.

6. In a device of the character described, the combination with the manifold of an engine, a two-part casing incorporated in said manifold and including upper and lower plates having alined openings therethrough communicating with the opening of the manifold and constituting a passage, means for securing the plates of the casing to the manifold, and a swinging valve arranged in the casing and having an imperforate portion and a portion provided with an opening, operating means for the valve and locking mechanism for securing the valve in closed position including a bolt engageable with the valve, and key operating means for releasing the bolt.

JOHN ARTHUR JOHNSON.
JAMES PEARL THOMPSON.